US007708642B2

(12) United States Patent
Hecht et al.

(10) Patent No.: US 7,708,642 B2
(45) Date of Patent: *May 4, 2010

(54) GAMING DEVICE HAVING PITCH-SHIFTED SOUND AND MUSIC

(75) Inventors: William L. Hecht, Reno, NV (US); Kristopher E. Landrum, South Lake Tahoe, CA (US)

(73) Assignee: IGT, Reno, NV (US)

( * ) Notice: Subject to any disclaimer, the term of this patent is extended or adjusted under 35 U.S.C. 154(b) by 764 days.

This patent is subject to a terminal disclaimer.

(21) Appl. No.: 09/978,795

(22) Filed: Oct. 15, 2001

(65) Prior Publication Data

US 2003/0073490 A1 Apr. 17, 2003

(51) Int. Cl.
*A63F 13/00* (2006.01)

(52) U.S. Cl. .......................................... 463/35; 463/16

(58) Field of Classification Search ............. 463/16–20, 463/35, 1, 23; 84/611, 612, 619, 626–633, 84/635–636, 657, 662–665, 667–668; 704/503; 273/138.1, 148 R; 715/744; 709/203
See application file for complete search history.

(56) References Cited

U.S. PATENT DOCUMENTS 3,831,172 A 8/1974 Olliges et al.
4,300,225 A 11/1981 Lambl
4,314,236 A 2/1982 Mayer et al.
4,339,798 A 7/1982 Hedges et al.
4,344,345 A 8/1982 Sano
4,363,482 A 12/1982 Goldfarb
RE31,441 E 11/1983 Nutting et al.
4,496,149 A 1/1985 Schwartzberg
4,582,324 A 4/1986 Koza et al.
4,618,150 A 10/1986 Kimura
4,624,459 A 11/1986 Kaufman
4,660,107 A 4/1987 Chippendale, Jr.
4,695,053 A 9/1987 Vazquez, Jr. et al.
4,712,189 A 12/1987 Mohri
4,732,386 A 3/1988 Rayfiel
4,733,593 A 3/1988 Rothbart (Continued)

FOREIGN PATENT DOCUMENTS

CA 2460127 1/1998

(Continued)

OTHER PUBLICATIONS

Merriam-Webster's Collegiate Dictionary, Tenth Edition, p. 886.*

(Continued)

*Primary Examiner*—Dmitry Suhol
*Assistant Examiner*—Masud Ahmed
(74) *Attorney, Agent, or Firm*—K&L Gates LLP

(57) ABSTRACT

The present invention provides an apparatus and method by which sound files may be modified within a gaming device to: (i) coincide with one or more other sound files; (ii) coincide with one or more game events; or (iii) to produce a melody or song. The gaming device includes various processors and memory storage devices that control a sound card. The sound card stores sound files having truly synthesized sounds or true sound recordings. The output sample rate of one or more sound files is pitch-shifted to produce a sound having a higher or lower pitch and that lasts for a shorter or longer length of time, respectively.

24 Claims, 4 Drawing Sheets

U.S. PATENT DOCUMENTS 4,791,558 A 12/1988 Chaitin et al.
4,876,937 A 10/1989 Suzuki
4,961,575 A 10/1990 Perry
4,974,483 A 12/1990 Luzzatto
4,974,857 A 12/1990 Beall et al.
5,046,735 A 9/1991 Hamano et al.
5,096,195 A 3/1992 Gimmon
5,119,465 A 6/1992 Jack
5,179,517 A 1/1993 Sarbin et al.
5,221,801 A 6/1993 Bruti et al.
5,223,828 A 6/1993 McKiel, Jr.
5,242,163 A 9/1993 Fulton
5,258,574 A 11/1993 Kawano
5,266,736 A 11/1993 Saito
5,275,400 A 1/1994 Weingardt et al.
5,287,102 A 2/1994 McKiel, Jr.
5,331,112 A 7/1994 Sato et al.
5,342,047 A 8/1994 Heidel et al.
5,371,345 A 12/1994 LeStrange et al.
5,390,938 A 2/1995 Takeya
5,393,061 A 2/1995 Manship et al.
5,393,070 A 2/1995 Best
5,429,507 A 7/1995 Kaplan
5,429,513 A 7/1995 Diaz-Plaza
5,430,835 A 7/1995 Williams et al.
5,446,902 A 8/1995 Islam
5,449,173 A 9/1995 Thomas et al.
5,469,511 A 11/1995 Lewis et al.
5,470,233 A 11/1995 Fruchterman et al.
5,472,197 A 12/1995 Gwiasda et al.
5,508,699 A 4/1996 Silverman
5,515,764 A 5/1996 Rosen
5,577,253 A 11/1996 Blickstein
5,606,144 A 2/1997 Dabby
5,625,845 A 4/1997 Allran
5,630,754 A 5/1997 Rebane
5,668,996 A 9/1997 Radinsky
5,695,188 A 12/1997 Ishibashi
5,697,843 A 12/1997 Manship et al.
5,703,310 A 12/1997 Kurakake et al.
5,707,286 A 1/1998 Carlson
5,715,459 A 2/1998 Celi
5,745,761 A 4/1998 Celi
5,745,762 A 4/1998 Celi
5,758,875 A 6/1998 Giacalone, Jr.
5,762,552 A 6/1998 Vuong et al.
5,766,074 A 6/1998 Cannon et al.
5,772,509 A 6/1998 Weiss
5,778,231 A 7/1998 Van Hoff
5,792,972 A 8/1998 Houston
5,802,364 A 9/1998 Senator
5,807,172 A 9/1998 Piechowiak
5,809,303 A 9/1998 Senator
5,812,688 A 9/1998 Gibson
5,830,069 A 11/1998 Soltesz et al.
5,833,538 A 11/1998 Weiss
5,839,958 A 11/1998 Ozarow
5,848,932 A 12/1998 Adams
5,854,927 A 12/1998 Gelissen
5,876,284 A 3/1999 Acres et al.
5,880,386 A 3/1999 Wachi et al.
5,889,990 A 3/1999 Coleman
5,892,171 A 4/1999 Ide
5,902,184 A 5/1999 Bennett et al.
5,908,354 A 6/1999 Okuniewicz
5,910,048 A 6/1999 Feinberg
5,911,071 A 6/1999 Jordan
5,920,720 A 7/1999 Toutonghi
5,920,842 A * 7/1999 Cooper et al. ............... 704/503
5,923,878 A 7/1999 Marsland
5,923,880 A 7/1999 Rose
5,930,509 A 7/1999 Yates
5,937,193 A 8/1999 Evoy
5,946,487 A 8/1999 Dangelo
5,946,489 A 8/1999 Yellin
5,964,846 A 10/1999 Berry
5,966,535 A 10/1999 Benedikt
5,967,894 A 10/1999 Kinoshita et al.
5,970,249 A 10/1999 Holze
5,978,585 A 11/1999 Crelier
5,997,401 A 12/1999 Crawford
5,999,731 A 12/1999 Yellin
6,003,038 A 12/1999 Chen
6,015,346 A 1/2000 Bennett
D421,277 S 2/2000 McGahn et al.
6,021,272 A 2/2000 Cahill
6,021,273 A 2/2000 Criesemer
6,026,238 A 2/2000 Bond
6,029,000 A 2/2000 Woosley
6,031,993 A 2/2000 Andrews
6,035,120 A 3/2000 Ravichandran
6,052,527 A 4/2000 Delcourt et al.
6,056,642 A 5/2000 Bennett
6,062,979 A 5/2000 Inoue
6,066,181 A 5/2000 DeMaster
6,071,192 A 6/2000 Weiss
6,074,432 A 6/2000 Guccione
6,075,940 A 6/2000 Gosling
6,079,985 A 6/2000 Wohl et al.
6,084,169 A 7/2000 Hasegawa et al.
6,086,894 A 7/2000 Inzana et al.
6,089,976 A 7/2000 Schneider et al.
6,089,978 A 7/2000 Adams
6,092,147 A 7/2000 Levy
6,096,095 A 8/2000 Halstead
6,102,400 A 8/2000 Scott et al.
6,103,964 A * 8/2000 Kay ............................ 84/611
6,106,393 A 8/2000 Sunaga et al.
6,110,041 A 8/2000 Walker et al.
6,110,043 A 8/2000 Olsen
6,110,226 A 8/2000 Bothner
6,113,495 A 9/2000 Walker
6,117,009 A 9/2000 Yoseloff
6,126,165 A 10/2000 Sakamoto
6,131,191 A 10/2000 Cierniak
6,138,273 A 10/2000 Sturges
6,141,794 A 10/2000 Dice
6,142,875 A 11/2000 Kodachi et al.
6,146,273 A 11/2000 Olsen
6,146,276 A 11/2000 Okuniewicz
6,155,925 A 12/2000 Giobbi et al.
6,159,097 A 12/2000 Gura
6,174,233 B1 1/2001 Sunaga et al.
6,174,235 B1 1/2001 Walker
6,175,632 B1 1/2001 Marx
6,198,395 B1 3/2001 Sussman
6,217,448 B1 4/2001 Olsen
6,224,482 B1 5/2001 Bennett
6,233,731 B1 5/2001 Bond et al.
6,238,288 B1 5/2001 Walker et al.
6,241,612 B1 6/2001 Heredia
6,254,481 B1 7/2001 Jaffe
6,270,411 B1 8/2001 Gura et al.
6,287,197 B1 9/2001 Dickinson et al.
6,293,869 B1 9/2001 Kwan et al.
6,295,638 B1 9/2001 Brown et al.
6,302,790 B1 10/2001 Brossard
6,306,034 B1 10/2001 Sakamoto et al.
6,309,299 B1 10/2001 Weiss
6,309,301 B1 10/2001 Sano
6,311,982 B1 11/2001 Lebensfeld et al.
6,321,323 B1 11/2001 Nugroho et al.
6,328,648 B1 12/2001 Walker et al.
6,383,073 B1 5/2002 Nagano

| | | | | |
|---|---|---|---|---|
| 6,390,923 | B1 | 5/2002 | Yoshitomi et al. | |
| 6,409,596 | B1 | 6/2002 | Hayashida et al. | |
| 6,416,411 | B1 | 7/2002 | Tsukahara | |
| 6,425,827 | B1 * | 7/2002 | Nimura | 463/35 |
| 6,504,089 | B1 | 1/2003 | Negishi et al. | |
| 6,516,466 | B1 | 2/2003 | Jackson | |
| 6,537,152 | B2 | 3/2003 | Seelig et al. | |
| 6,544,122 | B2 | 4/2003 | Araki et al. | |
| 6,554,703 | B1 | 4/2003 | Bussick et al. | |
| 6,561,908 | B1 | 5/2003 | Hoke | |
| 6,599,195 | B1 * | 7/2003 | Araki et al. | 463/43 |
| 6,638,169 | B2 | 10/2003 | Wilder et al. | |
| 6,656,046 | B1 | 12/2003 | Yoseloff et al. | |
| 6,729,618 | B1 | 5/2004 | Koenig et al. | |
| 6,739,973 | B1 | 5/2004 | Lucchesi et al. | |
| 6,769,985 | B1 | 8/2004 | Laakso et al. | |
| 6,810,517 | B2 | 10/2004 | Bond et al. | |
| 6,848,996 | B2 * | 2/2005 | Hecht et al. | 463/35 |
| 6,935,955 | B1 | 8/2005 | Kaminkow et al. | |
| 6,942,574 | B1 | 9/2005 | LeMay et al. | |
| 6,979,769 | B1 * | 12/2005 | Majima et al. | 84/645 |
| 7,355,112 | B2 | 4/2008 | Laakso | |
| 2001/0007542 | A1 * | 7/2001 | Fukuda | 369/24 |
| 2001/0029542 | A1 | 10/2001 | Nishimura | |
| 2002/0016203 | A1 * | 2/2002 | Nagata et al. | 463/35 |
| 2002/0077165 | A1 | 6/2002 | Bansemer et al. | |
| 2002/0090990 | A1 | 7/2002 | Joshi et al. | |
| 2002/0109718 | A1 | 8/2002 | Mansour et al. | |
| 2003/0064798 | A1 | 4/2003 | Grauzer et al. | |
| 2003/0064808 | A1 | 4/2003 | Hecht et al. | |
| 2003/0073489 | A1 | 4/2003 | Hecht et al. | |
| 2003/0073490 | A1 | 4/2003 | Hecht et al. | |
| 2003/0073491 | A1 | 4/2003 | Hecht et al. | |
| 2004/0053695 | A1 | 3/2004 | Mattice et al. | |
| 2004/0063489 | A1 | 4/2004 | Crumby | |
| 2004/0142739 | A1 | 7/2004 | Loose et al. | |
| 2004/0142747 | A1 | 7/2004 | Pryzby | |
| 2004/0209685 | A1 | 10/2004 | Lucchesi et al. | |
| 2005/0043090 | A1 | 2/2005 | Pryzby et al. | |
| 2005/0054440 | A1 | 3/2005 | Anderson et al. | |
| 2005/0054442 | A1 | 3/2005 | Anderson et al. | |
| 2005/0064935 | A1 | 3/2005 | Blanco | |
| 2005/0277469 | A1 | 12/2005 | Pryzby et al. | |
| 2005/0282631 | A1 | 12/2005 | Bonney et al. | |
| 2006/0073881 | A1 | 4/2006 | Pryzby et al. | |

FOREIGN PATENT DOCUMENTS

| | | | | |
|---|---|---|---|---|
| EP | 0 978 809 | A2 | | 2/2000 |
| EP | 0993847 | A1 | | 4/2000 |
| EP | 0 997 856 | A2 | | 5/2000 |
| EP | 0 997 857 | A2 | | 5/2000 |
| EP | 1000642 | A2 | | 5/2000 |
| EP | 1 079 345 | A1 | | 2/2001 |
| EP | 1197932 | | | 4/2002 |
| EP | 0 997 856 | A2 | | 5/2002 |
| EP | 1 225 565 | A2 | | 7/2002 |
| EP | 1439507 | A3 | | 3/2005 |
| GB | 2201279 | A | | 8/1988 |
| JP | 1197292 | A | | 12/1997 |
| JP | 11-216221 | | * | 8/1999 |
| JP | 411216221 | A | * | 8/1999 |
| JP | 411216221 | A | | 8/1999 |
| JP | 2000107466 | | | 4/2000 |
| JP | 02000296209 | A | | 10/2000 |
| JP | 2001062029 | | | 3/2001 |
| JP | 2003290422 | | | 10/2003 |
| RU | 2158060 | | | 10/2000 |
| WO | WO0217295 | | | 2/2002 |
| WO | WO 2005/113089 | | | 12/2005 |
| WO | WO 2005/114598 | | | 12/2005 |
| WO | WO 2005/117647 | | | 12/2005 |
| WO | WO 2005/120127 | | | 12/2005 |
| WO | WO2006017036 | A1 | | 2/2006 |
| WO | WO2006017445 | A2 | | 2/2006 |
| WO | WO2007044175 | | | 4/2007 |

OTHER PUBLICATIONS

"Sound". Encyclopedia Brittanica, 2007. Encyclopedia Brittanica Online: http://www.search/eb.com/eb/article-9068796. Retrieved May 23, 2007.*

Description of Maximum Wager Sound and Bet Sounds in Gaming Devices written by IGT, available prior to 2000.

Description of Sound Feature in Totem Pole™ Gaming Machine written by IGT, available in 1997.

Description of Tempo Change in Gaming Machines written by IGT, available prior to 2001.

Description of Volume Control Functions in Gaming Machines written by IGT, available prior to 2000.

Description of Last Sound in Credit Roll-Up in Gaming Machines written by IGT, available prior to 2001.

Description of Sound Effects in Gaming Devices written by IGT, available prior to 2001.

Description of Verbal Wager Feature in "Dick Clark" Gaming Machine written by IGT, available in 2000.

Description of Accelerated Credit Roll-Up in Gaming Machines written by IGT, available prior to 2000.

Description of Payout Sound Feature in Gaming Machine written by IGT, available prior to 2000.

Description of Progressive Sound Feature in Pinball and Video Games written by IGT, available prior to 2000.

Description of Action Prompts in Gaming Machines, written by IGT, available prior to 2000.

Article, "A Salute to Game Shows-The Price Is Right-Pricing Games-Three Strikes," p. 8 of 9, online, retrieved on Aug. 16, 2000. Retrieved from the Internet: <http://ben-schumin.simplenet.com/game-shows/shows/price-is-right/pricing-games-4.htm>.

Article, "Frankie & Annette's Beach Party Bally Gaming," published by Strictly Slots, Dec. 2001.

Article, "Megaman X's Soundcard History Museum," pp. 1-5, retrieved on May 11, 2000 on Internet at http://digitalparadise.cgocable.ca/MegaMan_X/Soundcards.

Article, "Microprocessor Report," pp. 2, 12-17, published by Micro Design Resources on Mar. 25, 1996.

Article, "Monopoly Movers & Shakers Williams/WMS Gaming," published by Strictly Slots publication in Jul. 2000.

Brochure of Bally Gaming, Inc., "EVO Hybrid Frankie & Annette's Beach Party," published by Bally Gaming, Inc. in the year 2001 on or before December thereof.

Brochure of Bally Gaming, Inc., "Frankie & Annette's Beach Party (EVO Hybrid)," http://www.ballygaming.com/gameroom/games.asp?gameID=664, Jan. 9, 2004.

Brochure of IGT, "Elephant King," http://www.igt.com/games/new_games/elephant.html, Mar. 21, 2001.

Brochure of IGT, "Leopard Spots, Double Diamond 2000, Little Green Men, Elephant King, I Dream of Jeannie," available in Oct. 1999.

Brochure of IGT, "Run for Your Money S-Plus Limited," published in the year 1998 on or before December thereof.

Brochure of IGT, "Top Dollar S-Plus Limited," published in the year 1998 on or before December thereof.

Brochure of IGT, "Totem Pole," written by IGT, available in the year 1997, on or before December thereof.

Brochure of IGT, "Wheel of Fortune," published in the year 1998 on or before December thereof.

Brochure of WMS Gaming Inc., "Meet the Next Generation of Monopoly Slot Machines from WMS Gaming!" published by Hasbro, Inc. in the year 1999 on or before December thereof.

Brochure of WMS Gaming Inc., "Monopoly Chairman of the Board," published by Hasbro, Inc. in the year 1999 on or before December thereof.

Brochure of WMS Gaming Inc., "Monopoly Once Around," published by Hasbro, Inc. in the year 1998 on or before December thereof.

Brochure of WMS Gaming Inc., "Monopoly Reel Estate," published by Hasbro, Inc. in the year 1998 on or before December thereof.
Brochure of WMS Gaming Inc., "Movers & Shakers," published by Hasbro, Inc. in the year 2000 on or before December thereof.
Chutes and Ladders CD-ROM Game, Hasbro Interactive, Inc., available in the year 1999 on or before December thereof.
Description of Lighting Features in Gaming Machines, written by IGT, available in the year 1999 on or before December thereof.
MIDI Media Adaptation Layer for IEEE-1394, published by the Association of Musical Electronics Industry in Tokyo, Japan and the MIDI Manufacturers Association in Los Angeles, California, Nov. 30, 2000, pp. 1-17.
Press Release by Ian Fried of CNET News.com, "Microsoft Releases XP for Slot Machines," file://C:WINDOW...\Microsoft releases XP for slot machines—Tech News—CNET.com.htm., Nov. 28, 2001, pp. 1-2.
Press Release, "WMS Gaming's Monopoly Slot Machines Named 1998's Most Innovative Gaming Product At The American Gaming, Lodging and Leisure Summit," published by WMS Gaming Inc. on Jan. 13, 1999.
Screen Shot and Description by IGT of "Free Spins Bonus (Elephant King)" written by IGT, available in Oct. 1999.
Screen Shots of "Race Car Bonus Feature" written by IGT, available in the year 1998 on or before December thereof.
The Java™ Tutorial, "What Can Java Technology Do?" http://java.sun.com/docs/books/tutorial/getStarted/i.../definition.htm, Oct. 16, 2000, pp. 1-2.
The MIDI File Format, http://crystal.capana.org.au/ghansper/midi_introduction/midi_file_format.html, Dec. 28, 2001, pp. 1-10.
Tutorial on MIDI and Music Synthesis. Datasheet [online]. MIDI Manufacturers Association, 1995-2001 [retrieved on Mar. 13, 2007]. Retrieved from the Internet: <URL: www.midi.org/about-midi/tutorial/tutor.shtml>.

* cited by examiner

GAMING DEVICE HAVING PITCH-SHIFTED SOUND AND MUSIC

CROSS REFERENCE TO RELATED APPLICATIONS

This application is related to the following commonly-owned co-pending patent applications: "Gaming Device With Award and Deduction Proximity-Based Sound Effect Feature," Ser. No. 09/656,663; "Gaming Device and Method for Enhancing the Issuance or Transfer of an Award," Ser. No. 09/583,482, "Gaming Device Providing Audio Wagering Information," Ser. No. 09/629,288; "Gaming Device Having Changed or Generated Player Stimuli," Ser. No. 09/686,244; "Gaming Device With a Metronome System for Interfacing Sound Recordings," Ser. No. 09/687,692; "Gaming Device With Sound Recording Changes Associated With Player Inputs," Ser. No. 09/978,607, and "Gaming Device Having Pitched-Shifted Sound and Music," Ser. No. 09/978,795.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to gaming devises having accompanying sounds or music. More particularly, the present invention relates to gaming device music or sounds that may be adapted to fit various musical contexts that occur during play of the gaming device.

Gaming device manufacturers provide slot machines employing a plurality of reels, wherein the reels each have a plurality of symbols. In these games, the player spins the reels, which produce a random generation of a combination of symbols. If the generated combination, or a portion of the combination, matches one of a number of predetermined award producing or winning combinations, the player receives an award. The award is commonly one or more credits that the player can play or redeem for money.

Gaming device manufactures also provide video poker games that generate credits for the player. The player can either use the awarded credits to play more poker hands or redeem the credits for money. These examples as well as many other types of gaming machines award credits to the player.

To increase player enjoyment and excitement, and to increase the popularity of the gaming machines, gaming device manufacturers constantly strive to provide players with new features that add to the excitement and enjoyment generated by the gaming device. It is common for gaming machines to play or produce sounds or music that accompanies the gaming event and is in accordance with the theme of the gaming machine. Such sounds or music may be played at various points throughout the above described games.

In slot machines, for example, the game typically plays music while the reels spin, i.e., while the reels are producing a wining or losing outcome for the player. Because this is an exciting time for the player, it is an opportune time to produce or play sounds and music. Very often the music follows a theme of the gaming device. For example, if the theme of the gaming device is surfing, the gaming device can play beach music and sounds associated with surfing, such as ocean waves, etc.

Besides reel spins, the gaming device can associate sounds with other gaming events. One well known sound that gaming devices employ is the paytone or credit roll-up sound. The paytone is the "ding", "ding", "ding" sound, which the gaming device plays when downloading an amount of credits to the player after a gaming device win. The paytone loosely emulates the sound of a coin or token hitting the coin payout tray upon a cash out by the player.

It should be appreciated that music and sounds play an important role in gaming devices in both entertaining and informing the player. The sounds and music also help to create a mood or tempo surrounding a particular game event or an overall feel for the gaming device. As gaming devices become more intricate and as the competition to produce the most fun and entertaining games stiffens, sounds and in particular interactive sounds will play an ever increasing roll in gaming devices. It is therefore desirable to provide an apparatus and a method for using the apparatus, wherein certain sounds or music stored in the gaming device may be readily adapted to fit a particular game setting or a particular musical accompaniment.

SUMMARY OF THE INVENTION

The present invention provides an apparatus and method by which sound files may be modified within a gaming device to: (i) coincide with one or more other sound files; (ii) coincide with one or more game events; or (iii) to produce a melody or song. The gaming device includes one or more processors and memory storage devices that employ a sound card to play music and sound effects through one or more speakers. The sound card stores sound files having truly synthesized sounds or true sound recordings. The output sample rate of one or more sound files is changed to produce a sound having a higher or lower pitch.

Known gaming devices play sound files at a specified rate. The gaming device of the present invention can play sound files at various rates. Playing sound files at various rates also varies the duration of the sound file. The tempo of a musical fragment or section also increases or decreases as the pitch shifts up or down. The gaming device can thereby play sound files at various pitches, tempos and for varying time periods. The gaming device achieves the various pitches, tempos and time periods by changing the rate of at which the gaming device plays the sound file. As used herein, a change in pitch is referred to as a "pitch-shift" and a sound file played at a different rate is referred to as a "pitch-shifted" sound or sound file.

The gaming device may employ the pitch-shifted sounds in a variety of different ways. In one embodiment, the gaming device pitch-shifts one or more sound files based on one or more other sound files. For example, the gaming device can modify the sound of a paytone in accordance with concurrently playing background music. That is, the gaming device pitch-shifts a sound file so that it is musically compatible with another sound file. The gaming device in another example pitch-shifts one sound file so that it has a duration and/or tempo that makes musical sense with the duration or timing of another sound file.

In another embodiment, the gaming device pitch-shifts one or more sound files based on one or more gaming device events or states. For example, the gaming device can modify background music to last the length of a reel spin. Or, the gaming device can pitch-shift a pitch or key of one sound based on a particular player input. That is, one input causes the gaming device to play the file at one pitch, while another input causes the file to be played at another pitch. That is, the gaming device in another example pitch-shifts a sound file so that it has a duration that makes sense with the duration of the gaming device event.

In a further embodiment, the gaming device pieces together one or more pitch-shifted and/or unchanged sound files to produce a melody. For example, the gaming device can string together one or more pitch-shifts of a trumpet file to play different pitches or tones to form a melody or song. In this manner, a melody can be constructed from a single sound file. That is, the sound can be pitch-shifted in different amounts to produce different pitches or notes. Other pitch-shifted sound file melodies can be so constructed and played concurrently or sequentially to produce an entire song using a single sound file for each instrument.

It is therefore an advantage of the present invention to provide a gaming device that pitch-shifts a sound file.

Another advantage of the present invention is to provide a gaming device that pitch-shifts a sound file to provide a different tempo and duration based on another sound file to play the pitch-shifted file for a desired duration.

Still another advantage of the present invention is to provide a gaming device that pitch-shifts a sound file one or more times and plays the pitch-shifted files to produce a desired melody.

Moreover, an advantage of the present invention is to provide a method of saving memory in sound files of a gaming device.

Still further, an advantage of the present invention is to provide a method of modifying a melody of a true sound recording without having to rerecord one or more instruments.

Additional features and advantages of the present invention are described in, and will be apparent from, the following Detailed Description of the Invention and the figures.

DETAILED DESCRIPTION OF THE INVENTION

Gaming Device and Electronics

Figure 1A:
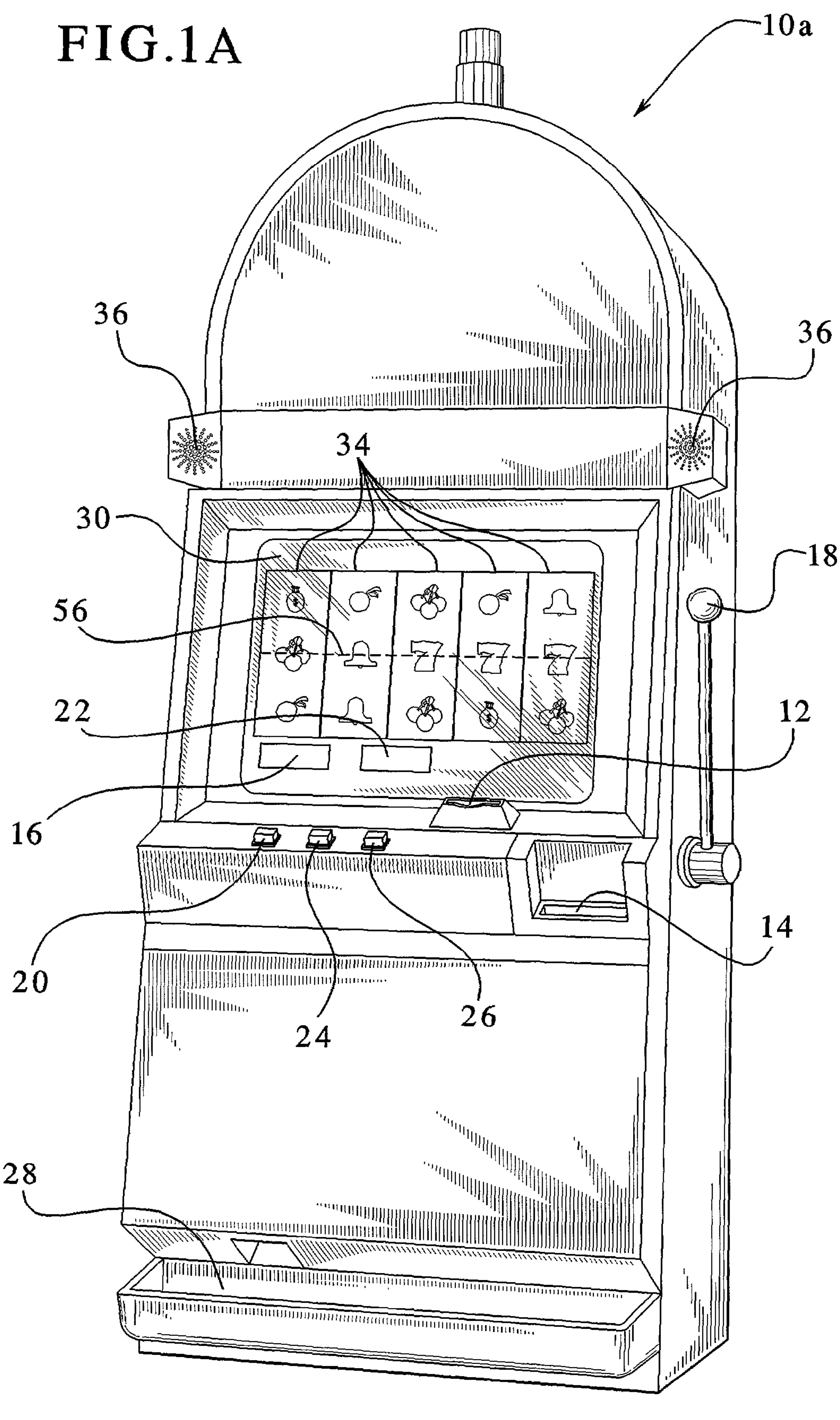
FIGS. 1A and 1B are perspective views of alternative embodiments of the gaming device of the present invention.
Figure 1B:
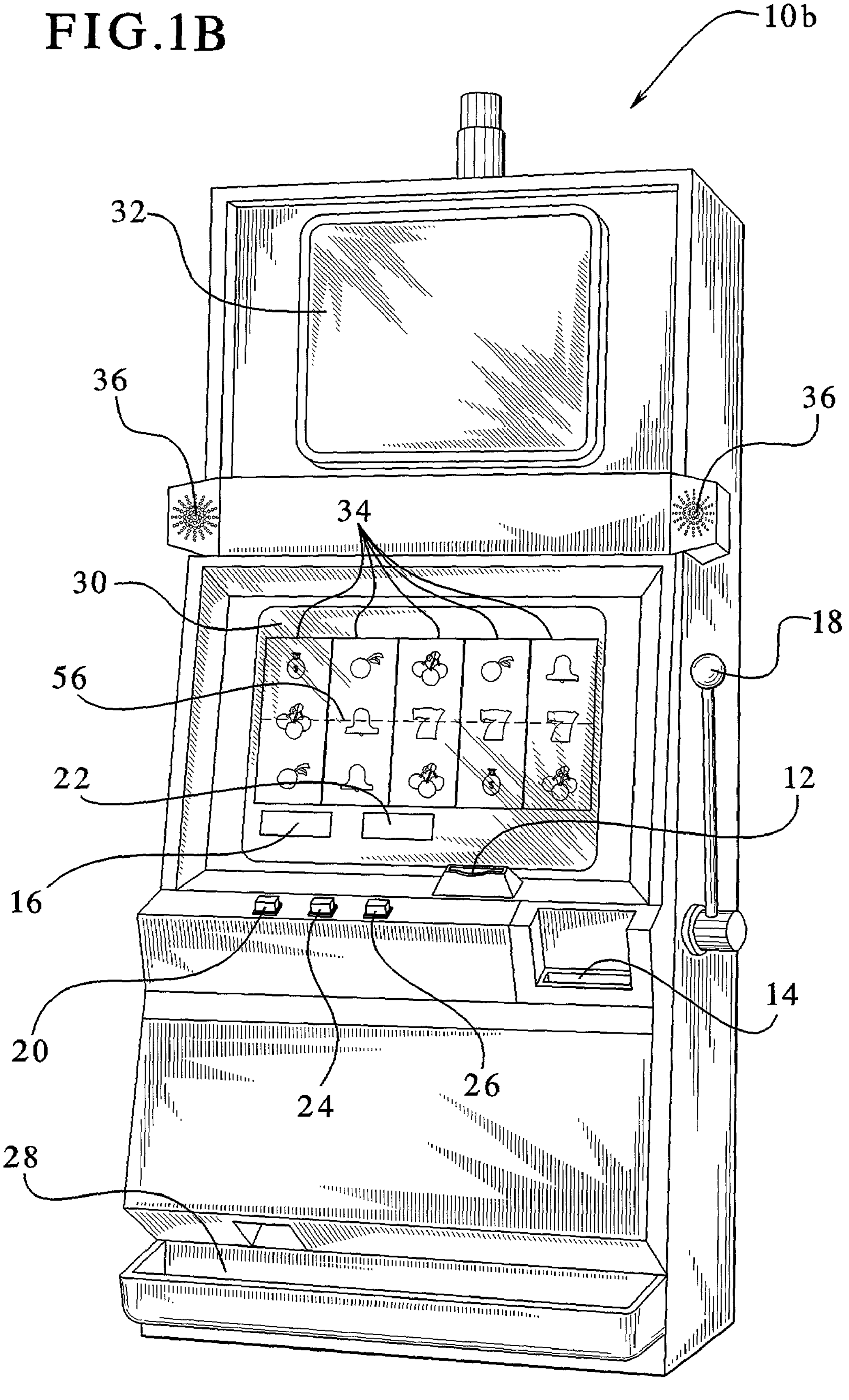

Referring now to the drawings, and in particular to FIGS. 1A and 1B, gaming device 10*a* and gaming device 10*b* illustrate two possible cabinet styles and display arrangements and are collectively referred to herein as gaming device 10. The gaming device of the present invention has the controls, displays and features of a conventional gaming machine. The player may operate the gaming device while standing or sitting. Gaming device 10 also includes being a pub-style or table-top game (not shown), which a player operates while sitting.

The base games of the gaming device 10 may include slot, poker, blackjack or keno, among others. The gaming device 10 may also embody any bonus triggering events, bonus games as well as any progressive game coordinating with these base games. The symbols and indicia used for any of the base, bonus and progressive games include mechanical, electronic, electrical or video symbols and indicia.

The gaming device 10 preferably includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images or symbols which preferably correspond to a theme associated with the gaming device 10. If the reels 34 are in video form, the display device displaying the video reels 34 is preferably a video monitor. Each gaming device 10 includes speakers 36 for making sounds or playing music as described below.

Figure 2:
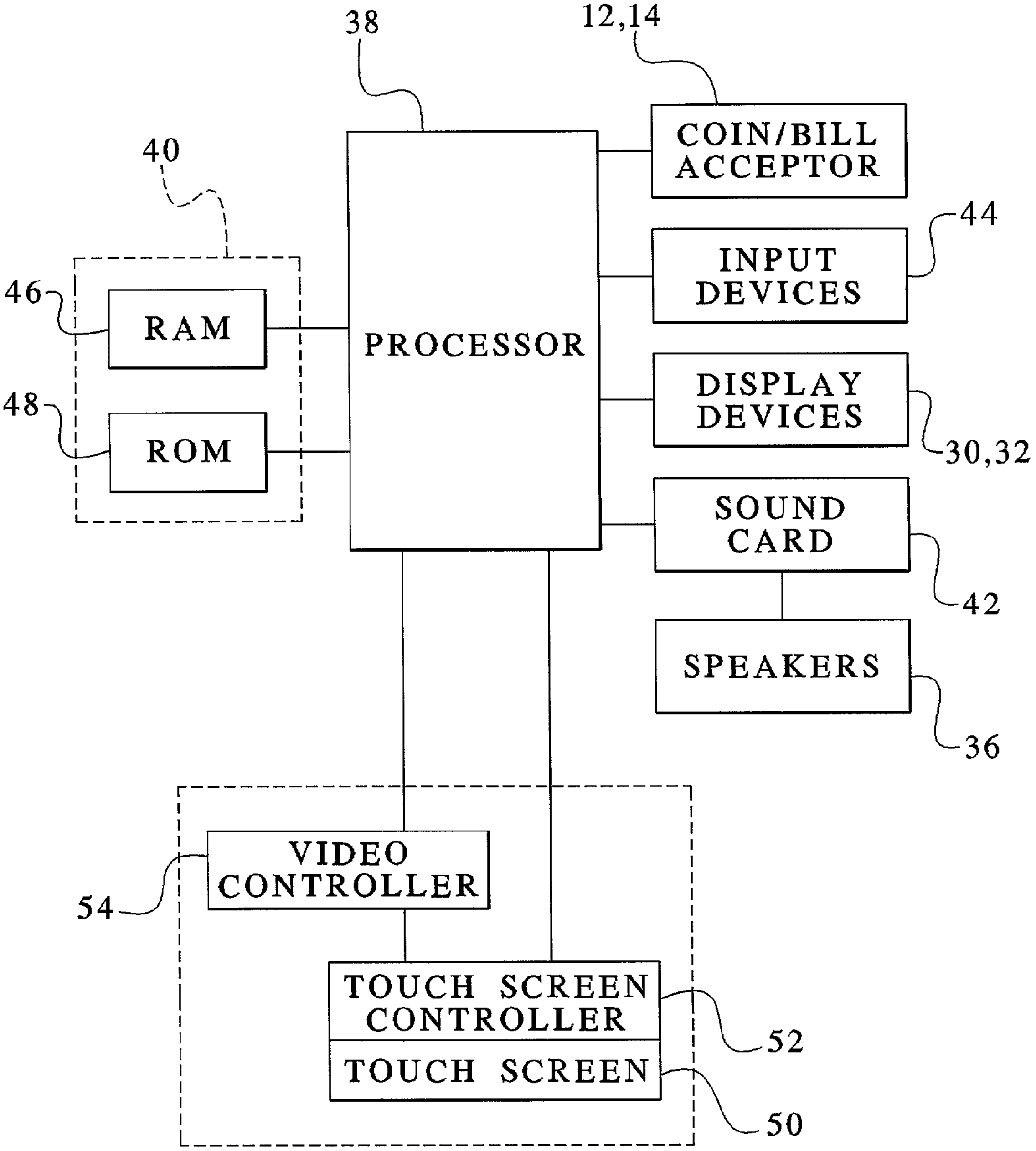
FIG. 2 is a schematic diagram of the electronic configuration of one embodiment of the gaming device of the present invention.

Referring now to FIG. 2, a general electronic configuration of the gaming device 10 preferably includes: a processor or central processing unit ("CPU") 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory ("RAM") 46 for storing event data or other data generated or used during a particular game. The memory device 40 also includes read only memory ("ROM") 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively and alternatively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, may also include one or more bonus games that give players the opportunity to win credits. The gaming device 10 may employ a video-based display device 30 or 32 for the bonus games. The bonus games include a program that automatically begins when the player achieves a qualifying condition in the base game.

In the slot machine embodiment, the qualifying condition may include a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the gaming device may include one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Figure 3:
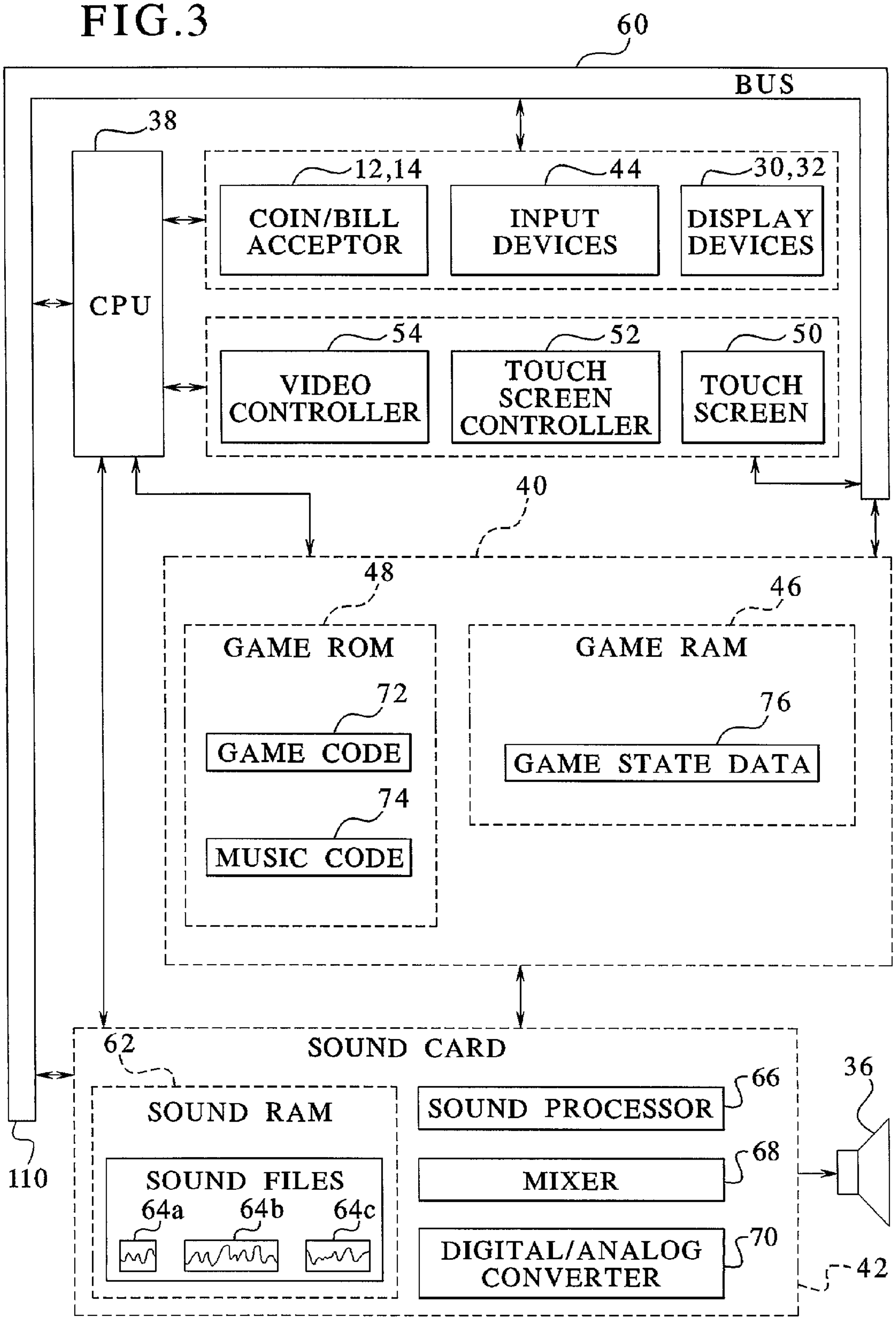
FIG. 3 is a schematic diagram of the electronic configuration of one embodiment of the gaming device of the present invention showing a sound card having a plurality of wave files.

Referring now to FIG. 3, a schematic diagram shows the interaction of the sound card 42, the processor or CPU 38, the memory device 40 and the speakers 36 in more detail. Each of the sound card 42, the CPU 38 and the memory device 40 electronically communicate with one another through a bus 60. For reference, the coin slot 12 or bill acceptor 14, the central display device 30, the upper display device 32, one or more speakers 36 and one or more input devices 44 are also illustrated.

Although the present invention is illustrated herein using the sound speakers 36, the present invention is equally applicable to any type of sound emitting device. As used in the claimed invention, the term "sound emitting device" includes the speakers 36 as well as any other type of device that is capable of emitting sound. For example, sound emitting device also includes ultrasonic emitters.

In one embodiment, sound card 42 is an expansion board that enables the CPU 38 in coordination with a game program stored in memory device 40 to manipulate and output sounds. Sound card 42 enables the CPU 38 to output sound through speakers 36 connected to the card 42. The sound card 42 also enables sounds to be recorded from a microphone (not illustrated) connected to the CPU 38 or to store prerecorded sound files. The sound card 42, as described in more detail below, also enables sound files to be manipulated.

Sound card 42 includes sound random access memory ("RAM") 62 which includes a plurality of sound files 64*a*, 64*b* and 64*c*. Obviously, the sound card 42 can store many sound files and is not limited to the three shown here for purposes of illustration. The sound files include any type of sound file readable by the CPU 38. In one embodiment, sound files 64*a* to 64*c* are digital wave files of musical sound recordings and sound effect recordings.

In an alternative embodiment, sound files are stored on a sound chip, which may or may not be part of a sound card 42. Although the present invention is illustrated herein using the sound card, the present invention is equally applicable to any suitable type of sound storage medium. Thus, for the purposes of the describing the claimed invention, the term "sound storage medium" includes the sound card 42, a sound chip or any other type of device that enables sound to be stored, recalled and played. The sound card 42 is also any device capable of reading sound files from the storage medium and converting the sounds into a form ultimately usable by the sound emitting device.

Typically, the quality of a sound file depends on the sampling rate and the bit depth or number of bits used to record the file. The sampling rate is the number of times per second that a snapshot of the sound is taken during its recording. For musical sound recordings, the sound files 64*a* to 64*c* in one embodiment have been recorded at about 44,000 Hz or 44,000 samples per second. Lower sampling rates cut off the higher and lower frequencies that are typical in music files. Acceptable sound effect recordings, e.g., voice, paytones or other "ding" type sounds, can be recorded at sampling rates as low as 8,000 Hz.

The bit depth is the number of digital ones and zeros used to record the sound files 64*a*, 64*b* and 64*c*. As is well known in the art of sound recording, the more bits per file, the more accurately the files 64*a*, 64*b* and 64*c* can be reproduced. Equipment using eight-bit sampling can be used to produce sound files 64*a*, 64*b* and 64*c*. In a preferred embodiment, the equipment uses 16-bit sampling or better.

The sound card 42 includes a sound processor 66 which drives a mixer 68 and a digital to analog converter 70. Mixer 68 enables the sound processor 66 to vary the volume of the sound recordings. The digital to analog converter 70 converts the digital sound files 64*a* to 64*c* to analog signals suitable for the speakers 36 to amplify into desired sounds. As discussed below, the sound processor 66 also enables the sound files 64*a* to 64*c* to be sampled at various rates, so that the files are outputted to the speakers at a desired pitch or for a desired duration of time.

FIG. 3 also illustrates that the game ROM 48 of the memory device 40 includes game code 72, i.e., a game program, and music code 74. Game code 72 includes the instructions that control the gaming device 10 to play a particular game in accordance with applicable game rules and pay tables. The music code 74 includes a set of instructions that the CPU 38 uses to determine the type, duration, and volume of the files 64*a* to 64*c* to be played. In an embodiment, the music code 74 is a commercially available code such as music instrument digital interface (MIDI).

The RAM 46 includes game state data 76. The game state data 76 is data generated by the CPU 38 when a sound-causing event occurs in a game. As discussed below, any predetermined event can be a sound-causing event. Sound-causing events of the present invention include the initiation or triggering of a primary or bonus game; any type of loss or accumulation of credits; a credit roll-up; an award of a jackpot; any type of random generation event, such as the spin of the reels 34 (FIGS. 1A and 1B), the generation of a number of poker or blackjack cards or numbers for keno; a winning, losing or push outcome; or a display designed to attract a play to play gaming device 10, etc.

Sound-causing events also occur upon a player's selection of an electromechanical input device 44 or an input device that is an area of the touch screen 50. The inputs include any type of decision made by the player in a primary or secondary game of the gaming device 10. The inputs include any type of wagering input such as a selection of the play button 20, the bet one button 24, the cash out button 26, max line or max bet buttons (not illustrated), etc. In one embodiment, each sound-causing event is associated with its own game state data 140 which includes flag data. The flag data directs the CPU 38 to make a particular sound file change.

Thus, upon a sound causing event, CPU 38 selects one or more sound files 64*a* to 64*c*. In accordance with the game code 72 and the music code 74 of the present invention, the sound processor 66 acts to pitch-shift one or more of the sound files 64*a* to 64*c* that have been selected by the CPU 38 to be played from one or more speakers 36.

The sound card 42 of the present invention can translate the digital sound files 64*a* to 64*c* into analog sounds using a variety of techniques. In one embodiment, the sound card 42 uses frequency modulation or FM synthesis. FM synthesis mimics different musical instruments according to mathematical formulas built into the sound card 42. The electronics of the sound card 42 produces combinations of waveforms that approximate the sounds of different instruments. That is, the sounds are synthetic. Because the sounds are simulated, they are readily pitch-shifted to produce a desired pitch or to be played for a desired duration of time. FM synthesis enables a plurality of sounds to be played and/or pitch-shifted concurrently or sequentially.

In another embodiment, the sound card 42 uses wave table synthesis. In this embodiment, the digital sound files 64*a* to 64*c* are recordings of actual instruments or sound effects. A real piano, for example, is recorded, wherein a small sample based on the recording is stored as one of the sound files 64*a* to 64*c* on the sound card 42. Thus when the game code 72 and music code 74 cause the sound card 42 to play a tuba sound, the speakers 36 emit the sound of an actual tuba.

The sound files 64*a* to 64*c* store digital samples of sound from any type of instrument, sound effect device, voice or from any other desired sound producing device. The sound processor 66 of the sound card 42 can thereafter combine, edit, pitch-shift speed-up, slow-down, enhance and reproduce one or more of the sounds through the speakers 36. In an embodiment, gaming device 10 can play up to 32 different instruments or sound effects at one time or in a specified sequence.

The present invention includes employing one of the synthesizing methods above to produce a desired pitch-shifted sound, wherein the method plays a sound file 64*a* to 64*c* at a faster or slower speed than the speed at which it has been recorded. The resulting pitch-shifted sound file has a different pitch and plays for a different amount of time than would the unchanged sound file. For example, one of the sound files 64*a* to 64*c* may include the sound of a trumpet playing at a particular pitch or note for a particular amount of time. When the sound card 42 speeds the play of the sound file up, the pitch of the trumpet raises and the duration of the sound shortens. Conversely, when the sound card 42 slows the play of sound file down, the pitch of the trumpet lowers and the duration of the sound lengthens.

In one embodiment, the sound card 42 pitch-shifts the sound files by changing or modifying the sample rate at which the processor 66 outputs the file. Increasing the sample rate speeds up the output of the sound file and likewise increases its pitch. Decreasing the sample rate slows down the output of the sound file and thereby decreases its pitch. Although the processor 66 can pitch-shift the output speed of a file by any desired factor, when the sound file 64*a* to 64*c* stores music, the factor preferably makes musical sense. For instance, doubling the speed of a musical sound file raises its pitch an entire octave and likewise cuts its duration in half.

The smallest factor by which the processor 66 pitch-shifts the musical sound file is preferably that which produces the smallest musical interval, i.e., a half-step. There are twelve half-steps in an octave. To raise or lower the pitch of a musical sound file a single half-step, the processor pitch-shifts the sound file 64*a* to 64*c* by a factor of $2^{1/12}$ or 1.0595. To raise the pitch two half-steps, the sound file is pitch-shifted by a factor of $1.0595 \times 1.0595$, and so on.

The present invention may be employed in a variety of ways and in a variety of scenarios. In one embodiment, the sound processor 66 pitch-shifts one or more sound files to match one or more other sound files. For example, a paytone file can be modified based on a background music file. That is, a paytone or credit roll-up sound may be recorded or stored at a particular pitch or key. If played unchanged, the sound card 42 plays the paytone at its recorded pitch and key. If the sound card 42 plays credit roll-up while simultaneously playing background music, the sound card 42 in one embodiment speeds up or slows down the paytone and increases or decreases its pitch or key accordingly to match fluctuations in pitch, key or mood of the background music. The paytone, which is used to provide game information to the player, i.e., to signal an award of game credits, thereby additionally becomes part of the background music.

In another example, the processor 66 pitch-shifts the sound file to alter the time duration of that sound file. For example, the background music file can be modified so that it only plays while paytones are played. The processor 66 pitch-shifts the background music file to coincide with shorter or longer credit roll-ups. Paytones generally coincide with the issuance of an increment of game credits. When the issuance stops, so do the paytones. Larger payouts therefore produce more paytones. The background music can therefore be pitch-shifted based on the size of the player's payout to match the duration of time of the corresponding paytones. In another illustration, one or more sound files may be pitch-shifted so that their play coincides with the play of background music during a reel spin.

Although the above examples illustrate concurrently played sound files, the processor 66 can alternatively play a pitch-shifted sound file sequentially with the another sound file. For example, a pitch-shifted sound file can be played to fill in a time gap left between two other sound files. The two other sound files dictate the duration of the time gap and the processor pitch-shifts a sound file based on the time gap. Two or more pitch-shifted sound files may be played concurrently or simultaneously. The two or more pitch-shifted sound files may be pitch-shifted based on the same sound file or different sound files.

In another embodiment, the sound processor 66 pitch-shifts one or more sound files based on a game event. For example, if a bonus game includes a mouse that "squeaks" upon a player's selection, the "squeak" file can be modified and played whenever the player inputs a selection that causes an award to be issued. The pitch of a sound file can therefore be tied to particular inputs, e.g., the bet one button 24 yields a certain pitch while the cash out button 26 yields another. Any game event or sound-causing event listed above of the gaming device 10 can be set to yield a desired pitch for a selected sound file 64*a* to 64*c*. The processor 66 alternatively raises or lowers the pitch of one or more files based on the intensity of a particular game, e.g., higher pitch if the stakes are high.

The processor 66 in another example changes the duration of the sound file based on a game event. In the credit roll-up example, the processor 66 can pitch-shift the speed of the background music file based on the length of time that a display device displays the credit roll-up rather than on the length of time that gaming device 10 plays the paytones. Or, in the reel spin example, the processor 66 can pitch-shift one or more sound files to end when the reel spins end. As above, two or more pitch-shifted sound files may be played concurrently or simultaneously, wherein the two or more pitch-shifted sound files may be pitch-shifted based on the same or different game event.

In a further embodiment, one or more sound files may be pitch-shifted one or more times and sequentially played to create a melody. The sound card 42 can take a single sound file 62*a* to 62*c* of, e.g., a trumpet and sequentially pitch-shift the sound file to create a continuously playing trumpet solo. The sound card can add other solos to form an entire song using a single sound file of each instrument. The sound card 42 can further add in sound effects as desired.

Considering that sound files consume a considerable amount of memory, especially the wave table files, it may be advantageous to pitch shift files to desired pitches rather than store an entire melody. Further, since it may be impractical to obtain a musician to record a small yet desirable change on an instrument, the present invention provides a method for the gaming device 10 to provide a "synthesized", true sound recording of a melody.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device;

at least one sound emitting device;

a processor; and a memory device which stores:

a data corresponding to a plurality of different stored sound files, the plurality of different stored sound files including:

(i) a first sound file corresponding to background music, the background music being unrelated to any gaming event, the background music having a background music pitch; and (ii) a second sound file associated with a designated gaming event, the second sound file being different than the first sound file, the second sound file corresponding to a continuous sound which when emitted continues for a period of time without any humanly perceptible silence periods, the continuous sound having an initial pitch which is different from the background music pitch;

(b) a plurality of instructions, which when executed by the processor, cause the processor to operate with the at least one display device, the at least one input device and the at least one sound emitting device, to:

(i) cause the at least one display device to display a game upon a wager placed by a player;

(ii) cause the at least one sound emitting device to emit the background music at the background music pitch; and (iii) while causing the at least one sound emitting device to emit the background music at the background music pitch:

(A) determine an occurrence of the designated gaming event;

(B) after the occurrence of the designated gaming event, pitch-shift the continuous sound associated with the designated gaming event from the initial pitch to a different, modified pitch such that the different, modified pitch matches the background music pitch of the background music; and (C) cause the at least one sound emitting device to emit the pitch-shifted continuous sound associated with the designated gaming event at the different, modified pitch such that the at least one sound emitting device emits the background music and the pitch-shifted continuous sound simultaneously.

2. The gaming device of claim 1, wherein the pitch-shifted continuous sound associated with the designated gaming event includes a credit roll-up sound.

3. The gaming device of claim 1, wherein the pitch-shifted continuous sound associated with the designated gaming event includes a reel spin sound.

4. The gaming device of claim 1, wherein, when emitted for the period of time, the different, modified pitch of the pitch-shifted continuous sound has a key that matches a key of the background music pitch of the background music.

5. The gaming device of claim 1, wherein a tempo of the pitch-shifted continuous sound having the different, modified pitch is different than a tempo of the continuous sound having the initial pitch.

6. The gaming device of claim 1, wherein a key of the pitch-shifted continuous sound having the different, modified pitch is different than a key of the continuous sound having the initial pitch.

7. The gaming device of claim 1, wherein a duration of the pitch-shifted continuous sound having the different, modified pitch is different than a duration of the continuous sound having the initial pitch.

8. The gaming device of claim 1, wherein the pitch-shifted continuous sound is emitted based on a modified sample rate.

9. A gaming device comprising:

at least one display device;

at least one input device;

at least one sound emitting device;

a processor; and a memory device which stores:

a data corresponding to a plurality of different stored sound files, the plurality of different stored sound files including:

(i) a first sound file corresponding to background music, the background music being unrelated to any gaming event, the background music having a background music pitch; and (ii) a plurality of different second sound files associated with a plurality of different gaming events, wherein for each one of the different gaming events, a different one of the second sound files is associated with said gaming event, each of the second sound files being different than the first sound file, each of the second sound files corresponding to a continuous sound which when emitted continues for a period of time without any humanly perceptible silence periods and has an initial pitch which is different from the background music pitch; and (b) a game program including a plurality of instructions, which when executed by the processor, cause the processor to operate with the at least one display device, the at least one input device, and the at least one sound emitting device in accordance with the game program to:

(i) cause the at least one display device to display a game a wager placed by a player;

(ii) cause the at least one sound emitting device to emit the background music at the background music pitch; and (iii) while causing the at least one sound emitting device to emit the background music at the background music pitch:

(A) determine an occurrence of a designated one of the gaming events;

(B) after the occurrence of the designated gaming event, pitch-shift the continuous sound of the second sound file associated with the designated gaming event from the initial pitch to a different, modified pitch such that the different, modified pitch matches the background music pitch of the background music; and (C) cause the at least one sound emitting device to emit the pitch-shifted continuous sound at the different, modified pitch such that the at least one sound emitting device emits the background music and the pitch-shifted continuous sound simultaneously.

10. The gaming device of claim 9, wherein the second sound file associated with the designated gaming event includes a credit roll-up sound.

11. The gaming device of claim 9, wherein the second sound file associated with the designated gaming event includes a reel spin sound.

12. The gaming device of claim 9, wherein, when emitted for the period of time, the different, modified pitch of the pitch-shifted continuous sound has a key that matches a key of the background music pitch of the background music.

13. The gaming device of claim 9, wherein a tempo of the pitch-shifted continuous sound having the different, modified pitch is different than a tempo of the continuous sound having the initial pitch.

14. The gaming device of claim 9, wherein a key of the pitch-shifted continuous sound having the different, modified pitch is different than a key of the continuous sound having the initial pitch.

15. The gaming device of claim 9, wherein a duration of the pitch-shifted continuous sound having the different, modified pitch is different than a duration of the continuous sound having the initial pitch.

16. The gaming device of claim 9, wherein the pitch-shifted continuous sound is emitted based on a modified sample rate.

17. A gaming device comprising:

at least one display device;

at least one input device;

at least one sound emitting device;

a processor; and a memory device which stores:

(a) a background music file which is accessible by the processor to cause background music to be emitted by the at least one sound emitting device, the background music being unrelated to any gaming event, the background music when emitted having a background music pitch;

(b) an event sound file associated with a designated event which is detectable by the processor, the event sound file being different than the background music file, the event sound file including digital sound data which represents a continuous event sound, the continuous event sound when emitted by the at least one sound emitting device:

(i) continuing for a period of time without any humanly perceptible silence periods; and (ii) having an initial pitch which is different from the background music pitch; and (c) a plurality of instructions, which when executed by the processor cause the processor to operate with the at least one display device, the at least one input device and the at least one sound emitting device to:

(i) cause the at least one display device to display a game upon a wager placed by a player;

(ii) cause the at least one sound emitting device to emit the background music at the background music pitch; and (iii) while causing the at least one sound emitting device to emit the background music at the background music pitch:

(A) detect an occurrence of the designated event, (B) determine a second pitch of the continuous event sound associated with the designated event, the determined second pitch being different from the initial pitch of the continuous event sound, the determination based on the background music pitch of the background music;

(C) after the occurrence of the designated event, pitch-shift the continuous event sound associated with the designated event from the initial pitch to the determined second pitch such that the determined second pitch matches the background music pitch of the background music; and (D) cause the at least one sound emitting device to emit the pitch-shifted continuous event sound associated with the designated event at the determined second pitch such that the at least one sound emitting device emits the background music and the pitch-shifted continuous event sound simultaneously.

18. The gaming device of claim 17, which includes at least one instruction which is executable by the processor to cause the processor to: (a) access the digital sound data at a plurality of different access rates; and (b) access the sound data at one of the access rates which is associated with the initial pitch.

19. The gaming device of claim 17, wherein the continuous event sound having the initial pitch is associated with a first tempo and the pitch-shifted continuous event sound having the determined second pitch is associated with a second tempo which is different than the first tempo.

20. The gaming device of claim 19, wherein the memory device stores: (a) music instrument digital interface code; and (b) at least one instruction which is executable by the processor to cause the at least one sound emitting device to emit at least one of: (1) the background music; and (2) the pitch-shifted continuous event sound based on said music instrument digital interface code.

21. A gaming system comprising:

at least one display device;

at least one input device;

at least one sound emitting device;

a processor; and a memory device which stores:

(a) a background music file which is accessible by the processor to cause background music to be emitted by the at least one sound emitting device, the background music being unrelated to any gaming event, the background music when emitted having a background music pitch;

(b) an event sound file associated with a designated event which is detectable by the processor, the event sound file being different than the background music file, the event sound file including digital sound data which represents a continuous event sound, the continuous event sound when emitted by the at least one sound emitting device:

(i) continuing for a period of time without any humanly perceptible silence periods; and (ii) having an initial pitch which is different from the background music pitch; and (c) a plurality of instructions, which when executed by the processor, cause the processor to operate with the at least one display device, the at least one input device and the at least one sound emitting device to:

(i) cause the at least one display device to display a game upon a wager placed by a player;

(ii) cause the at least one sound emitting device to emit the background music at the background music pitch; and (iii) while causing the at least one sound emitting device to emit the background music at the background music pitch:

(A) detect an occurrence of the designated event; and (B) after the detected occurrence of the designated event:

(1) determine which one of a plurality of pitches corresponds to the background music pitch of the background music;

(2) pitch-shift the continuous event sound associated with the designated event from the initial pitch to the determined pitch such that the determined pitch matches the background music pitch of the background music; and (3) cause the at least one sound emitting device to emit the pitch-shifted continuous event sound associated with the designated event at the determined pitch such that the at least one sound emitting device emits the background music at the background music pitch and the pitch-shifted continuous event sound at the determined pitch simultaneously.

22. The gaming system of claim 21, wherein the memory device stores a plurality of instructions, which when executed by the processor, cause the processor to: (a) access the digital sound data at a plurality of different access rates; and (b) access the sound data at one of the access rates which is associated with the initial pitch.

23. The gaming system of claim 21, wherein the continuous event sound having the initial pitch is associated with a first tempo and the pitch-shifted continuous event sound having the determined second pitch is associated with a second tempo which is different than the first tempo.

24. The gaming system of claim 21, wherein the memory device stores: (a) music instrument digital interface code, and (b) at least one instruction which is executable by the processor to cause the at least one sound emitting device to emit at least one of: (1) the background music, and (2) the pitch-shifted continuous event sound based on said music instrument digital interface code.

* * * * *

UNITED STATES PATENT AND TRADEMARK OFFICE
CERTIFICATE OF CORRECTION

PATENT NO. : 7,708,642 B2
APPLICATION NO. : 09/978795
DATED : May 4, 2010
INVENTOR(S) : William L. Hecht et al.

It is certified that error appears in the above-identified patent and that said Letters Patent is hereby corrected as shown below:

IN THE CLAIMS:

In Claim 1, Column 10, Line 12, replace "a", first occurrence, with --(a)--.

In Claim 1, Column 10, Line 26, insert --and-- after "pitch;".

In Claim 9, Column 11, Line 18, replace "a", first occurrence, with --(a)--.

Signed and Sealed this

Twenty-ninth Day of June, 2010

David J. Kappos

David J. Kappos
*Director of the United States Patent and Trademark Office*